US010605936B2

(12) United States Patent
Drange et al.

(10) Patent No.: US 10,605,936 B2
(45) Date of Patent: Mar. 31, 2020

(54) GEOPHYSICAL SENSOR CABLE METHODS AND SYSTEMS

(71) Applicant: PGS Geophysical AS, Oslo (NO)

(72) Inventors: Geir Andre Motzfeldt Drange, Oslo (NO); Jamie Alexander Ricks, Houston, TX (US)

(73) Assignee: PGS Geophysical AS, Oslo (NO)

( * ) Notice: Subject to any disclaimer, the term of this patent is extended or adjusted under 35 U.S.C. 154(b) by 314 days.

(21) Appl. No.: 15/788,363

(22) Filed: Oct. 19, 2017

(65) Prior Publication Data

US 2018/0113228 A1    Apr. 26, 2018

Related U.S. Application Data

(60) Provisional application No. 62/410,481, filed on Oct. 20, 2016.

(51) Int. Cl.
*G01V 1/20* (2006.01)
*G01V 1/38* (2006.01)

(52) U.S. Cl.
CPC ............ *G01V 1/201* (2013.01); *G01V 1/3808* (2013.01); *G01V 2210/1423* (2013.01)

(58) Field of Classification Search
CPC ................. G01V 1/201; G01V 1/3808; G01V 2210/1423
USPC .......................................................... 367/20
See application file for complete search history.

(56) References Cited

U.S. PATENT DOCUMENTS

| 3,819,848 | A | 6/1974 | Fry |
| 3,975,812 | A | 8/1976 | Fleischhacker et al. |
| 4,634,804 | A | 1/1987 | Spalding |
| 5,183,966 | A | 2/1993 | Hurtado et al. |
| 5,432,757 | A | 7/1995 | Chelminski |
| 5,606,150 | A | 2/1997 | Radliff et al. |
| 5,943,293 | A | 8/1999 | Luscombe et al. |
| 6,544,070 | B1 | 4/2003 | Radliff |
| 7,298,672 | B1 | 11/2007 | Tenghamn et al. |
| 8,502,072 | B2 | 8/2013 | Gehrke et al. |
| 8,622,765 | B2 | 1/2014 | Sulzer |
| 2001/0051453 | A1 | 12/2001 | Tachi |
| 2003/0026168 | A1 | 2/2003 | Behn et al. |
| 2006/0193203 | A1 | 8/2006 | Tenghamn et al. |
| 2010/0090851 | A1 | 4/2010 | Hauser |

(Continued)

FOREIGN PATENT DOCUMENTS

| EP | 0280486 A2 | 8/1988 |
| EP | 0678931 A1 | 10/1995 |
| WO | 2016178563 A1 | 11/2016 |

*Primary Examiner* — Daniel L Murphy

(57) ABSTRACT

Geophysical sensor cable. At least some of the example embodiments are methods including creating a geophysical sensor cable by: creating a first window through the insulation of a first electrical conductor; creating a second window through the insulation of a second electrical conductor; placing the first and second electrical conductors in a clip; twisting the first and second electrical conductors to create a twisted pair; electrically coupling a first lead of a seismic sensor to the first electrical conductor through a first window; electrically coupling a second lead of the seismic sensor to the second electrical conductor through a second window; encapsulating at least a portion of an internal volume of the clip; and placing the twisted pair and the seismic sensor within an outer jacket of a geophysical sensor cable.

22 Claims, 6 Drawing Sheets

(56) References Cited

U.S. PATENT DOCUMENTS

2015/0325336 A1 11/2015 Maples
2016/0347269 A1 12/2016 Breed et al.

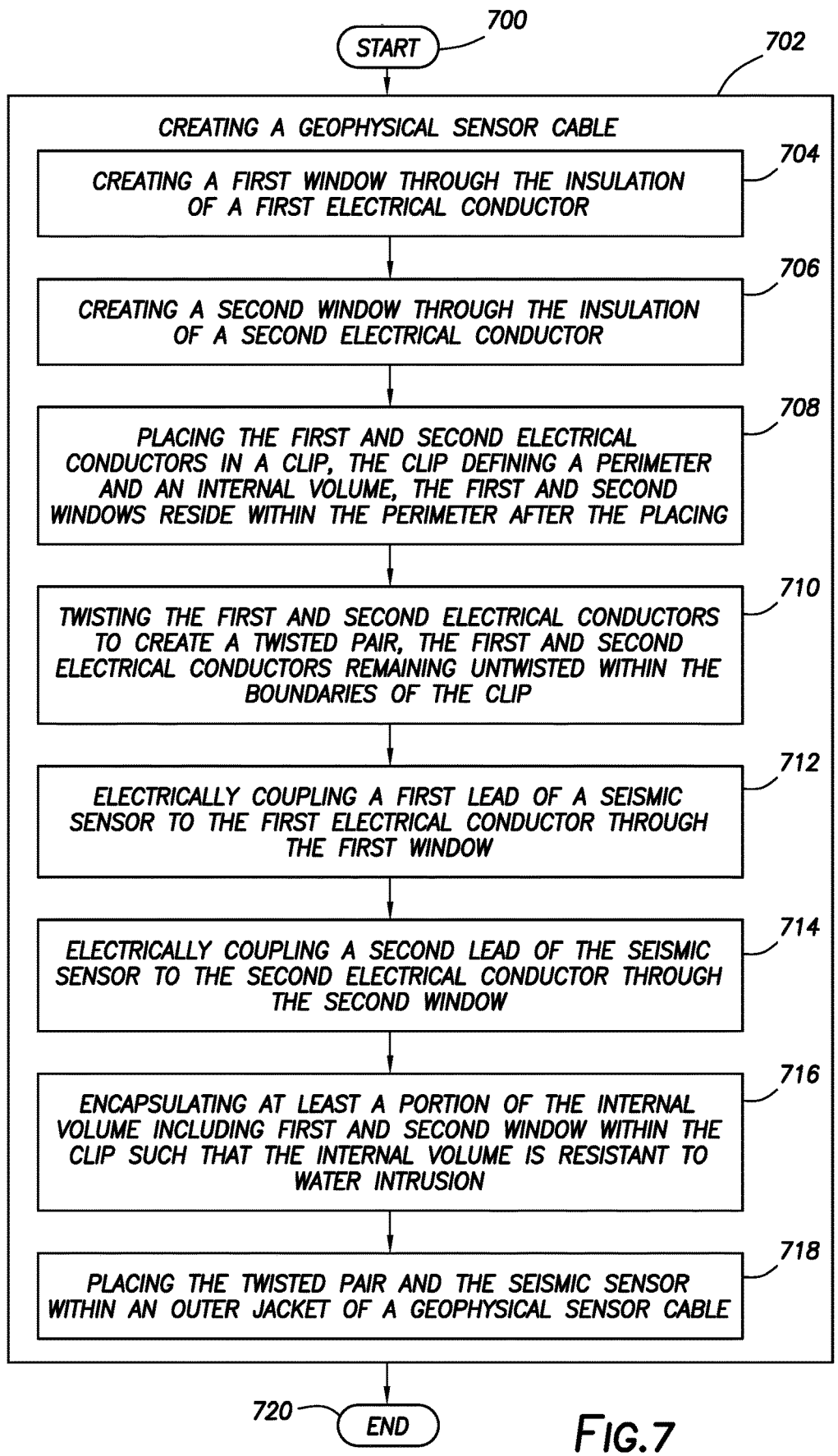

GEOPHYSICAL SENSOR CABLE METHODS AND SYSTEMS

CROSS-REFERENCE TO RELATED APPLICATIONS

This application claims the benefit of U.S. Provisional Application Ser. No. 62/410,481 filed Oct. 20, 2016 and titled "Wire Harness." The provisional application is incorporated by reference herein as if reproduced in full below.

BACKGROUND

This disclosure is related to the field of marine geophysical surveying. Marine geophysical surveying can include seismic and/or electromagnetic surveying, among others. For example, this disclosure may have applications in marine geophysical surveying, in which one or more source elements are used to generate wave-fields, and sensors—either towed or ocean bottom—receive energy generated by the source elements and affected by the interaction with the subsurface formation. The sensors thereby collect survey data which can be useful in the discovery and/or extraction of hydrocarbons from subsurface formations.

BRIEF DESCRIPTION OF THE DRAWINGS

For a detailed description of exemplary embodiments, reference will now be made to the accompanying drawings in which:

FIG. 7 shows a method in accordance with example embodiments.

DEFINITIONS

Figure 1:
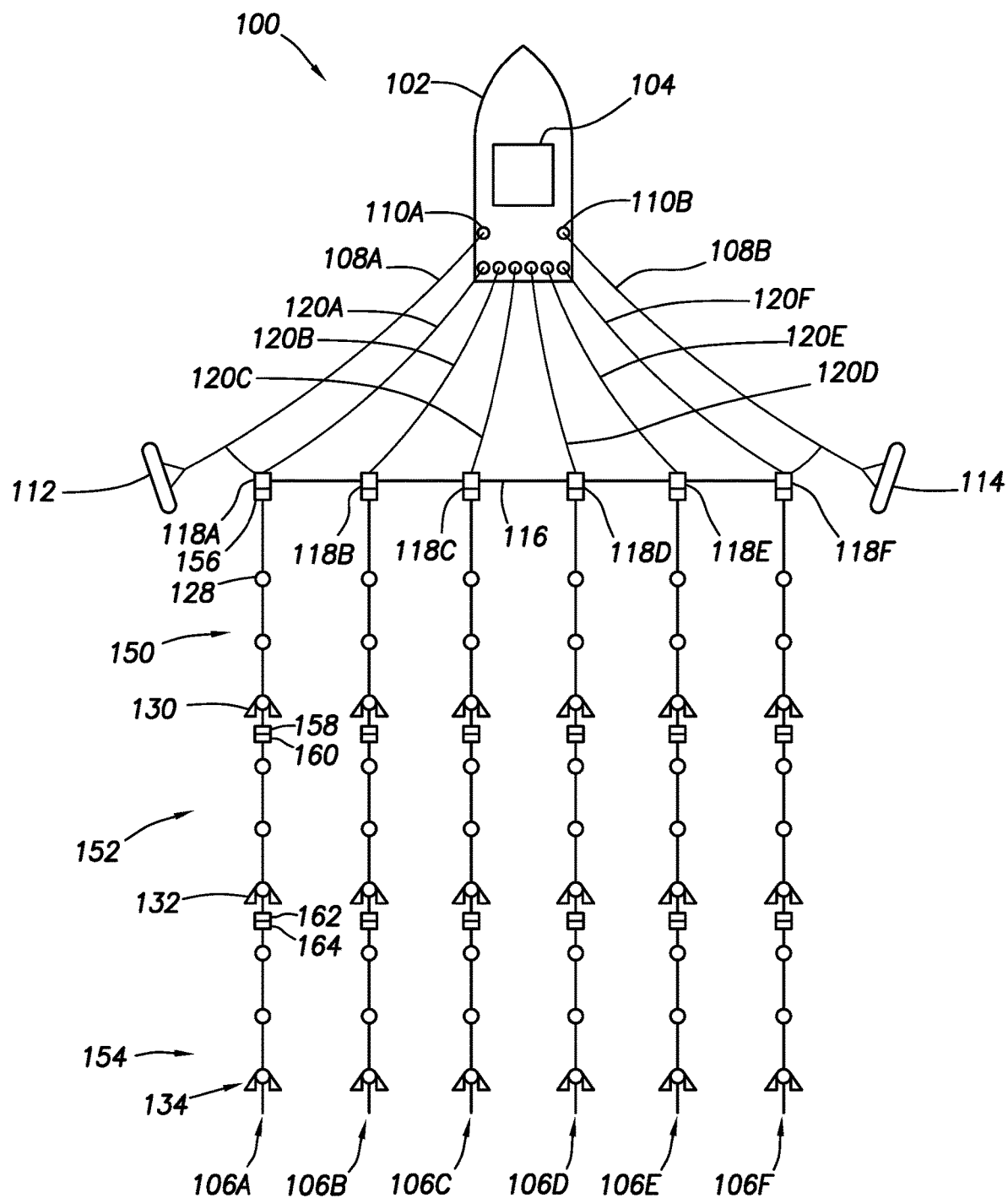
FIG. 1 shows an overhead view of a geophysical survey system in accordance with example embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection.

"Twisting" of multiple electrical conductors shall mean wrapping the electrical conductors around each other such that the electrical conductors have at least a predetermined (non-zero) number of turns or wraps over a distance of three to six meters. The fact that the electrical conductors remain untwisted over shorter distances (e.g., 10 centimeters or less, being the portions within a clip) shall not obviate the act of twisting the electrical conductors, and shall not obviate that the result of the twisting is a "twisted pair."

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Seismic sensor" shall mean any sensor enabled to detect the passage of acoustic (i.e., seismic) energy past the sensor, such as hydrophones and particle motion detectors (e.g., single or multiple-axis accelerometers, or single of multiple axis velocity sensors).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to geophysical sensor cables that include seismic sensors coupled in sensor groups. More specifically, various example embodiments are directed to systems and related methods to couple electrical leads of each seismic sensor to a twisted pair, where the systems and related methods reduce or eliminate the likelihood of the twisted pair electrically shorting at locations where the electrical conductors of the twisted pair are exposed though windows in the electrical insulation. Relatedly, various example embodiments are directed to use of a wire clip to hold a portion of the twisted pair in a particular orientation such that the process of electrically coupling leads of the seismic sensor to the twisted pair is less manually intensive, and in some cases may be automated. The specification first turns to example geophysical surveying systems to orient the reader, and then the specification turns to example geophysical sensor cables.

FIG. 1 shows an overhead view of a marine survey system 100 in accordance with at least some embodiments. In particular, FIG. 1 shows a tow or survey vessel 102 having onboard equipment, herein referred to collectively as recording system 104, such as navigation, energy source control, and a data acquisition system. Survey vessel 102 is configured to tow one or more geophysical sensor streamers 106A-106F through the water. While FIG. 1 illustratively shows six geophysical sensor streamers, any number of geophysical sensor streamers may be used.

The geophysical sensor streamers 106A-106F are coupled to towing equipment that maintains the geophysical sensor streamers 106A-106F at selected lateral positions with respect to each other and with respect to the survey vessel 102. The towing equipment may comprise two paravane tow lines 108A and 108B each coupled to the vessel 102 by way of winches 110A and 110ь, respectively. The second end of paravane tow line 108A is coupled to a paravane 112, and the second end of paravane tow line 108B is coupled to paravane 114. The paravanes 112 and 114 are configured to provide a lateral force component to the various elements of the survey system when the paravanes are towed in the water. The combined lateral forces of the paravanes 112 and 114 separate the paravanes from each other until the paravanes put one or more spreader lines 116, coupled between the paravanes 112 and 114, into tension.

The geophysical sensor streamers 106A-106F are each coupled, at the ends nearest the survey vessel 102 (i.e., the "proximal" or "forward" ends) to a respective lead-in cable termination 118A-118F The lead-in cable terminations 118A-118F are coupled to or associated with the spreader lines 116 so as to control the lateral positions of the geophysical sensor streamers 106A-106F with respect to each other and with respect to the vessel 102. Electrical and/or optical connections between the appropriate components in the recording system 104 and the sensors in the geophysical streamers 106A-106F (e.g., sensor 128 in geophysical sensor streamer 106A) may be made using inner lead-in cables 120A-120F, respectively.

In order to control depth of the geophysical sensor streamers, and in some cases to control lateral spacing between the geophysical sensor streamers, the geophysical sensor streamers may be associated with a plurality of streamer positioning devices periodically spaced along the geophysical sensor streamers. Again referring to geophysical sensor streamer 106A as representative, a positioning device 130 may be coupled near the proximal end of geophysical sensor streamer 106A. In some cases, the streamer positioning device 130 may provide only depth control, as the lateral spacing of the geophysical sensor streamer near the proximal end may be adequately controlled by the spreader cable 116. Further, representative geophysical sensor streamer 106A may be associated with streamer positioning devices 132 and 134, shown coupled further from the proximal ends. The streamer positioning devices 132 and 134 may provide not only depth control, but also lateral positional control. While FIG. 1 shows only three streamer positioning devices 130, 132 and 134 associated with representative geophysical sensor streamer 106A in practice each geophysical sensor streamer may be from a few thousand meters to 10 kilometers or more in length, and have many streamer positioning devices periodically spaced along the entire length of the geophysical sensor streamer (e.g., every 20-30 meters).

Each geophysical sensor streamer 106A-106F may comprise a plurality of geophysical sensor cables (hereafter just sensor cables) coupled end-to-end to create the overall geophysical sensor streamer 106A-106F. For example, and again referring to geophysical sensor streamer 106A as representative, the geophysical sensor streamer 106A may comprise a plurality of sensor cables 150, 152, and 154. While only three sensor cables are shown so as not to unduly complicate the figure, again in practice each geophysical sensor streamer may be a few thousand meters to 10 kilometers or more in length, and each sensor cable (e.g., sensor cables 150, 152, and 154) may be about 100 meters in length. Thus, an overall geophysical sensor streamer may be made up of one hundred or more individual sensor cables.

Still referring to geophysical sensor streamer 106A as representative, the proximal-most sensor cable 150 comprises a coupler 156 that couples to the lead-in cable 120A and spreader cable 116. Opposite the coupler 156, sensor cable 150 comprises a second coupler 158. Sensor cable 152 comprises a coupler 160 at the proximal end that couples to coupler 158 of sensor cable 150, and sensor cable 152 comprises a second coupler 162 at a distal end of the sensor cable 152. Sensor cable 154 comprises a coupler 164 at the proximal end that couples to coupler 162 of sensor cable 152, and sensor cable 154 comprises a second coupler (not specifically shown) at a distal end of the sensor cable 154, and so on. Thus, the representative geophysical sensor streamer 106A is constructed from a plurality of individual sensor cables (e.g., 150, 152, and 154), each of which may be about 100 meters in length.

The marine survey system of FIG. 1 is a towed system; however, in other cases the sensor cables may be coupled together as discussed with respect to geophysical sensor streamers, but instead used as ocean-bottom cables that remain stationary during the geophysical survey. In cases where the sensor cables are stationary, the seismic source may be towed by the tow vessel above the sensor cables. The discussion below regarding sensor cables is thus equally applicable to towed systems (i.e., geophysical sensor streamers) as well as ocean-bottom sensor cables. The discussion now turns to an example sensor cable.

Figure 2:
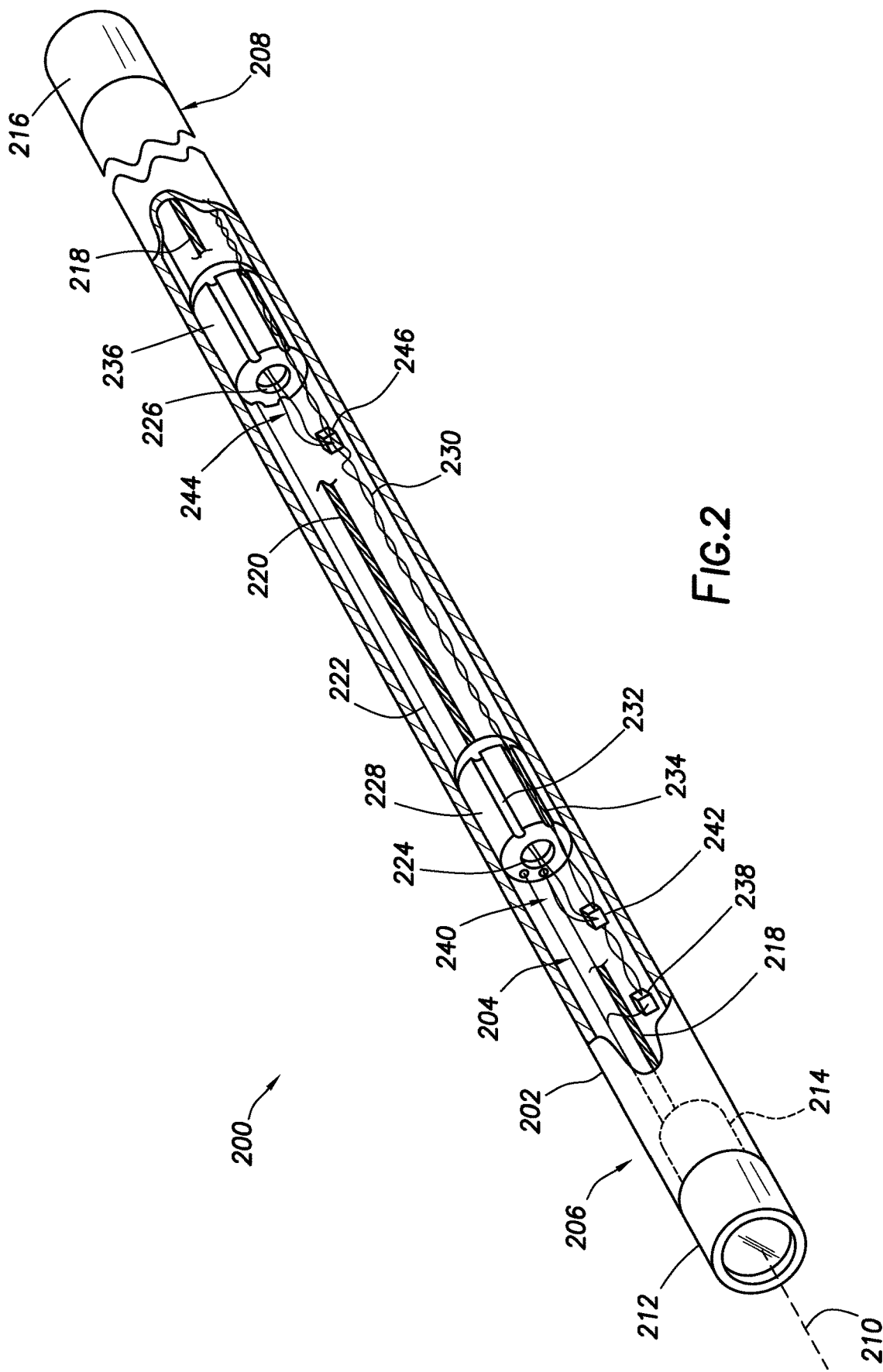
FIG. 2 shows a perspective, partial cut-away, view of a sensor cable in accordance with example embodiments.

FIG. 2 shows a perspective, partial cut away, view of a sensor cable 200 in accordance with example embodiments. In particular, example sensor cable 200 comprises an outer jacket 202 that defines an interior volume 204, a first end 206, and a second end 208 opposite the first end 206 along a long central axis 210 of the sensor cable 200. A coupler 212 (which coupler 212 could be any of the previously mentioned couplers) resides at the first end 206. The coupler 212 defines a reduced diameter portion 214, and the first end 206 of the outer jacket 202 telescopes over and seals against the reduced diameter portion 214. Likewise, the example sensor cable 200 comprises a second coupler 216 at the second end 208 opposite the first end 206. The coupler 216 also defines a reduced diameter portion over which the second end 208 of the outer jacket 202 telescopes and against which the outer jacket 202 seals, but the reduced diameter portion of coupler 216 is not shown so as not to unduly complicate the figure.

In the example sensor cable 200, tension associated with towing forces (or forces associated with deploying and retrieving the cable in an ocean-bottom context) are carried by strength members in the form of ropes coupled between the couplers such that the outer jacket 202 carries little (if any) of the towing force, and the ropes are disposed within the interior volume 204 of the outer jacket 202. In particular, example sensor cable 200 comprises two strength members 218 and 220, both of which run the length the sensor cable 200 and mechanically couple to the couplers 212 and 216. In order not to obscure other aspects of the sensor cable to be explained below, portions of the strength members 218 and 220 are removed from the drawing of FIG. 2. Nevertheless, strength member 218 would be the closest in the view of FIG. 2, and runs between the coupler 212, through the channel 232 of the sensor holder 228, through the channel (unnumbered) of sensor holder 236, and then to coupler 216. Strength member 220 would be "deeper" in the sensor cable in the view of FIG. 2, and runs between the coupler 212, through a channel on the back side of sensor holder 228, through a channel on the back side of sensor holder 236, and then to coupler 216. While FIG. 2 shows two strength members 218 and 220, one or more strength members may be used.

Still referring to FIG. 2, the example sensor cable 200 further comprises a backbone communication channel 222 coupled on the first end 206 to the coupler 212, and the backbone communication channel 222 coupled on the second end 208 to the coupler 216. The backbone communication channel 222 extends through the interior volume 204 of the outer jacket 202. As the name somewhat implies, the backbone communication channel 222 is the communication channel over which long-haul communications are carried to and from the recording system 104 (FIG. 1), including the data acquisition system of the recording system 104. The backbone communication channel may be any suitable system with sufficient bandwidth, such as one or more optical fibers, one or more twisted pair communications cables, or combinations thereof.

The example sensor cable 200 further comprises a plurality of seismic sensors spaced along the sensor cable 200 within the outer jacket 202. In the example sensor cable 200 of FIG. 2, two seismic sensors 224 and 226 are shown (partially), but in practice each sensor cable 200 may have one hundred or more seismic sensors depending on the spacing of the seismic sensors and the length of the sensor cable 200. Seismic sensor 224 is disposed within a sensor holder 228 that holds the seismic sensor 224 at a particular location within the interior volume 204 along the length of the sensor cable 200. As shown the example sensor holder 228 holds the seismic sensor 224 centered in the interior volume 204. Holding the seismic sensor 224 centered in the interior volume 204 is not required, and other off-center placements, as well as holding the seismic sensor 224 in a gimballed arrangement, are also contemplated. The example sensor holder 228 defines an exterior surface that is largely circular and thus abuts at least some of the inside diameter of the outer jacket 202. However, in order to accommodate the various strength members, backbone communication channels, and twisted pair 230 electrical conductors (discussed more below), the sensor holder 228 comprises various apertures that may include channels accessible through the exterior surface. For example, channel 232 may provide space for the strength member 218 (removed from the drawing at the location of the sensor holder 228 so as not to obscure other components) to extend past the sensor holder 228. A similar channel (not specifically numbered) exists on the opposite side of the sensor holder 228 for strength member 220. As yet another example, the backbone communication channel 222 may also extend through a channel (shown but not specifically numbered). Finally, the example sensor holder 228 may comprise a channel 234 through which the twisted pair 228 may extend. Seismic sensor 226 is also shown to be disposed within sensor holder 236, and example sensor holder 236 has similar channels as those discussed with respect to the sensor holder 228.

Still referring to FIG. 2, the example sensor cable 200 further includes a twisted pair 230 that extends at least partially through the interior volume 204 of the outer jacket 202. The twisted pair 230 comprises a first electrical conductor with electrical insulation on an outside diameter thereof and a second electrical conductor with electrical insulation on an outside diameter (discussed more below). In example systems, the seismic sensors may be coupled in sensor groups (e.g., the seismic sensors coupled in parallel), and twisted pair 230 may thus electrically couple the seismic sensors of one sensor group to an acquisition module 238. The acquisition module 238, in turn, communicatively couples to the backbone communication channel 222 as shown, with the communicative coupling being an electrical coupling, an optical coupling, or combinations thereof depending on the nature of the backbone communication channel 222. While FIG. 2 shows only one twisted pair 230, each sensor group may comprise its own twisted pair and acquisition module 238.

In example systems, each sensor group may span between and including three meters and six meters of the overall length of the sensor cable 200 depending upon the target depth of a formation of interest for which the sensor cable 200 will be used as part of a geophysical seismic survey. Thus, for an example sensor cable having a one hundred meter length, the sensor cable may have 16 sensor groups (for 6 meter span sensor groups) to 33 sensor groups (for 3 meter span sensor groups). Within a sensor group, the seismic sensors may be spaced between and including 60 and 80 centimeters (cm). Thus, the example sensor cable 200 of the FIG. 2 shows only a portion of one sensor group, but the sensor cable may have many more sensor groups (and thus many more sensors).

The example seismic sensors 224 and 226 each electrically couple to the twisted pair 230 by way of electrical leads. Referring first to seismic sensor 224, seismic sensor 224 defines two electrical leads 240 that electrically couple to the twisted pair 230 at location 242. Likewise, seismic sensor 226 defines two electrical leads 244 that electrically couple to the twisted pair 230 at location 246. The nature of the electrical coupling at the locations 244 and 246 is discussed in reference to FIG. 3.

Figure 3:
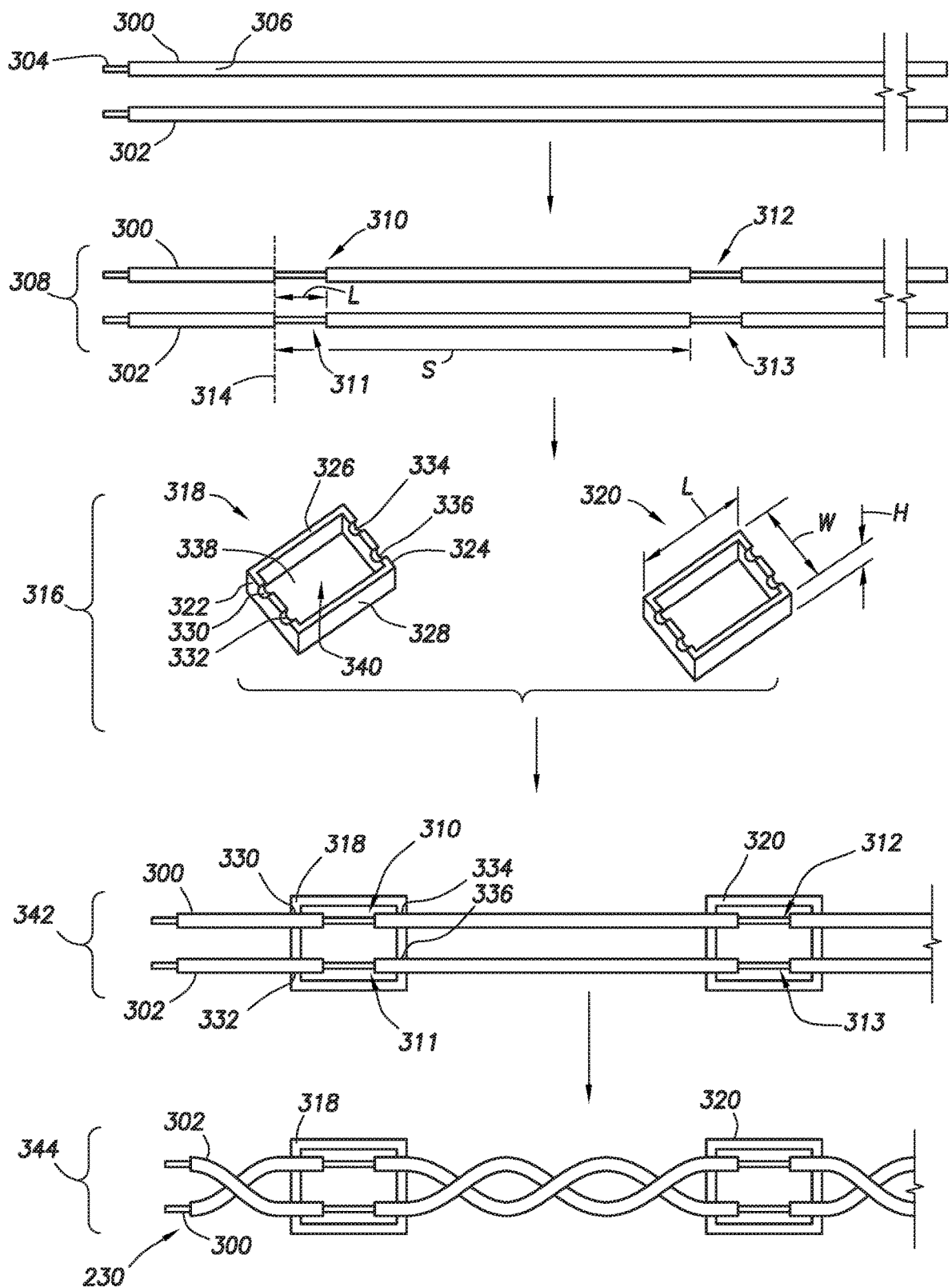
FIG. 3 shows an overhead view of components to illustrate a further series of steps in accordance with example embodiments.

In order to describe the electrical coupling of the electrical leads of the seismic sensors, the specification now turns to certain aspects of construction of a sensor cable, such as sensor cable 200. FIG. 3 visually shows a first portion of a series of steps, and example hardware, to construct a sensor group in accordance with example embodiments. In particular, the sensor groups of a sensor cable may be constructed starting with two electrical conductors 300 and 302. Referring to electrical conductor 300 as representative of both, each electrical conductor comprises an internal metallic conductor 304 as well as an external electrical insulation 306. The metallic conductor 304 is shown exposed for purposes of explanation, but may or may not be so exposed during the sensor group construction process. In example systems, each electrical conductor is a 26 gauge wire, but other gauges are possible.

The next step in the example method is creating windows through the electrical insulation at locations near where a seismic sensor will be located, as shown at level 308 of FIG. 3. In particular, at periodic locations along the electrical conductors, the electrical insulation is removed to create windows, such as windows 310 and 312 associated with electrical conductor 300, and windows 311 and 313 associated with electrical conductor 302. The windows (e.g., 310/312, 311/313) may be created using any suitable method, including manually removing the electrical insulation as well as automated systems, such as systems that use lasers or blades to create the windows. The spacing between the windows will approximately match the desired sensor spacing, so the spacing S between the windows (measured from a consistent location, such as the end of the electrical insulation as shown, or center-to-center may be between and including 60 and 80 cm. The axial length of each window may be between and including one centimeter and two centimeters.

While FIG. 3 shows the two electrical conductors 300 and 302 side-by-side at the second level 308, in many cases the process of creating the windows through the electrical insulation takes place on each electrical conductor individually (e.g., feeding each electrical conductor through a machine that creates the windows). Thus, to arrive at the physical relationship shown at the second level 308, the electrical conductors are aligned such that the windows through the electrical insulation are likewise aligned. In the example arrangement of FIG. 3, the windows are aligned such that the proximal ends (i.e., in FIG. 3, the ends closest to the exposed metallic conductor 304) of each window are aligned axially. A bit more technically described, the example alignment is such that proximal ends of windows 310 and 311 reside in a plane and the electrical conductors 300 and 302 are perpendicular to the plane at the location of the proximal ends of the windows 310 and 311. In the view of the second level 308 of FIG. 3, the plane is itself perpendicular to the page, and thus the plane 314 is shown as a dashed line. Of course, the same statement can be made in reference to either side of the windows (e.g., the distal ends of the windows). Stated slightly differently, the end of the electrical insulation which defines a first end of the window 310 resides in a plane 314, the plane perpendicular to the electrical conductor 300 at the location of the window 310, and the second boundary of the window resides on one side of the plane 314. The window 311 through the second conductor 302 is similarly situated.

The next step in the example method is placing the electrical conductors (at the location of each set of windows) into a clip, and example clips are shown on the third level 316 of FIG. 3. In particular, the third level 316 shows two identical clips 318 and 320. The discussion that follows is with respect to clip 318 as representative of both clips. Example clip 318 comprises a first wall 322 and opposite second wall 324, which in the example systems are parallel to each other. The first wall 322 and second wall 324 are coupled together by sidewalls 326 and 328, which in the example systems are parallel to each other. The four walls 322, 324, 326, and 328 of the example clip 318 define a rectangular structure, though other geometric shapes (including circular and oval shapes with no structural delineations between the walls) are also contemplated. The first wall 322 has two notches or slots 330 and 332. The slots 330 and 332 are open at the top of the first wall 322, and in example embodiments the slots have internal dimensions (e.g., internal diameters) sized to be slightly smaller than an outside diameter of the electrical insulation of the electrical conductors. Likewise, the second wall 324 has two notches or slots 334 and 336. The slots are open at the top of the second wall 324, and in example embodiments the slots have internal dimensions (e.g., internal diameters) sized to be slightly smaller than an outside diameter of the electrical insulation of the electrical conductors. In some cases, the clips have a wall at the bottom 338 such than the internal volume 340 of the clip defines a trough, but in other cases (and as shown) the bottom 338 is open.

Shifting to clip 320 as representative of both clips, in example systems the clip 320 has a length L of between and including two to three centimeters, but larger and smaller clip lengths are contemplated. Moreover, in example systems the clip 320 has a width W of between and including one to two centimeters, but again larger and smaller clip widths are contemplated. In example systems the clip 320 has a height H of between and including 0.25 to one centimeter, but again larger and smaller clip heights are contemplated. The thickness of the walls 322-328 will depend on the structural strength of the material from which the clip is constructed, and the material in example embodiments is a rigid, non-conductive material, such as any of a variety of plastic materials. Thus, in example cases thickness of the walls 322-328 may be between and including 0.2 to 0.5 cm.

Still referring to FIG. 3, and particularly the fourth level 342, the next step in the example method of constructing the sensor group is, for each set of aligned windows, placing the electrical conductors 300 and 302 in clips, such as shown with respect to clip 318 and windows 310 and 311, as well as clip 320 and windows 312 and 313. In particular, placing electrical conductor 300 into clip 318 may comprise pushing electrical insulation on a first side of window 310 into slot 330, and pushing electrical insulation on a second side of window 310 into slot 334, such that the window 310 resides within the perimeter defined by the walls 322-328. Stated slightly differently, the window 310 resides within the internal volume of the clip 318. Likewise, placing electrical conductor 302 into clip 318 may comprise pushing electrical insulation on a first side of window 311 into slot 332, and pushing electrical insulation on a second side of the window 311 into slot 336, such that the window 311 in the second electrical conductor 302 resides within the perimeter defined by the walls 322-328, or stated slightly differently the window 311 resides within the internal volume of the clip 318. The process is repeated for the electrical conductors 300 and 302 with respect to clip 320 as well as the remaining clips of the sensor group (not shown so as not to unduly complicate the figure).

In the example method/system of the fourth level 342 of FIG. 3, the electrical conductors within the clips are parallel to each other and reside within the same plane (within the clip), the plane parallel to the top surface of the clip. However, the electrical conductors need not be parallel, and any arrangement where the metallic conductors are exposed through windows and are accessible for electrical coupling (discussed more below) may be used.

The next step in the example method of constructing the sensor group is creating a twisted pair 230 from the electrical conductors 300 and 302, such as shown at the fifth level 344 of FIG. 3. In particular, once the clips for the sensor group are installed, the electrical conductors are twisted to create the twisted pair 230. The twisting may be a manual process, where one end of the electrical conducts are held stationary and the opposite end of the electrical conductors are turned to create the twisted pair. In other cases, the twisting to create the twisted pair 230 may be an automated process such that the tension on the electrical conductors 300 and 302 during the twisting, and the number of turns per unit distance, may be precisely controlled.

In the related art, the electrical conductors are twisted without the presence of the clips. The windows through the electrical insulation make the electrical conductors 300 and 302 slightly less rigid at the location of the windows, and thus, in the absence of the clips 318, 320, the twisting process tends to not only occur first at the location of the windows, but also tends to bring the metallic conductors exposed through the windows into contact with each other, shorting the twisted pair 230. Moreover, in order to electrically couple leads of the seismic sensors to the twisted pair, in the related art the technician is required to manually untwist the electrical conductors at the location of the windows. Thus, use of the example clips 318 and 320 holds the electrical conductors at the locations of the clips such that the electrical conductors are not twisted (i.e., remain untwisted) within the clips, the electrical conductors are not shorted, and the technician need not untwist the twisted pair to make the windows accessible.

Figure 4:
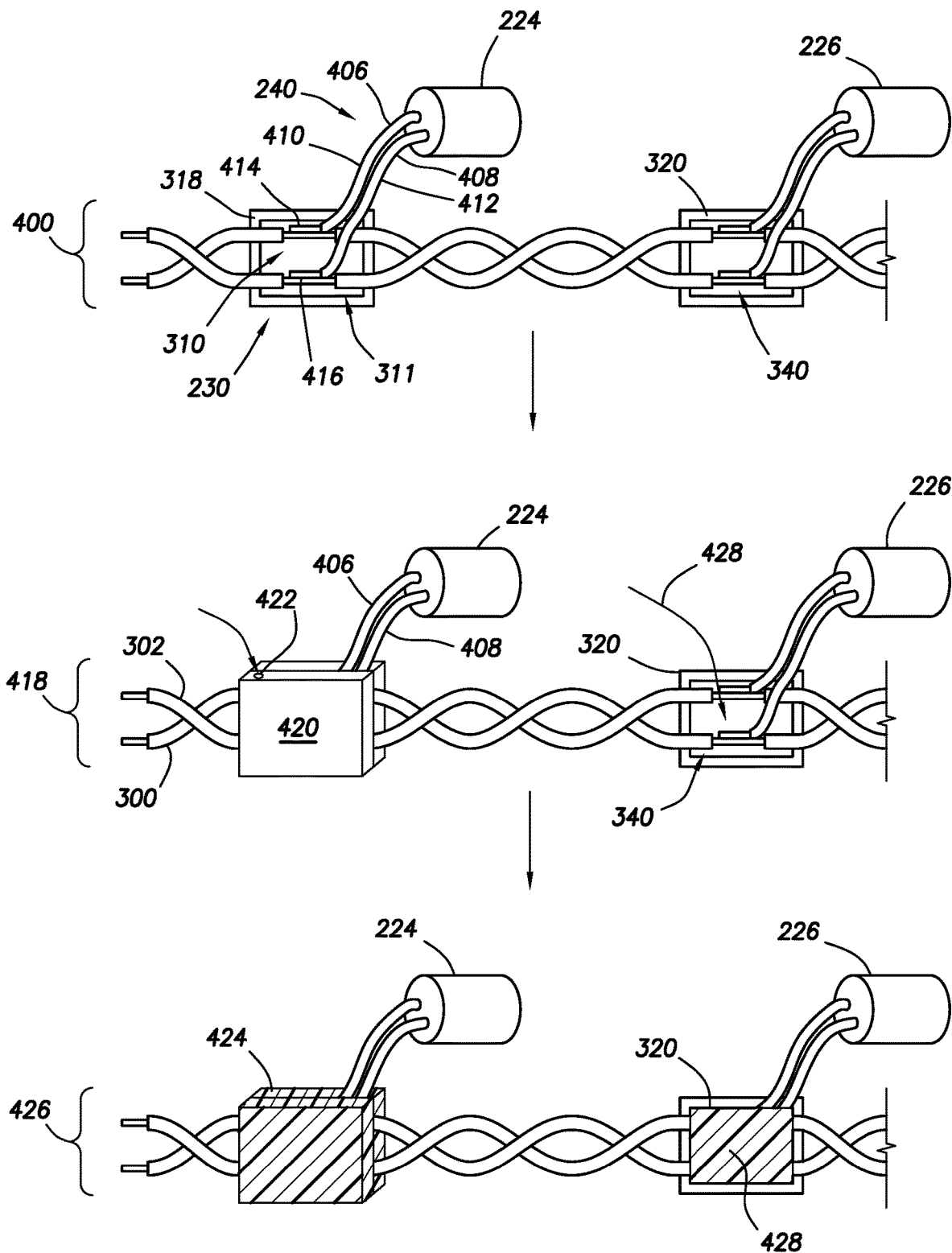
FIG. 4 shows an overhead view of components to illustrate a series of steps in accordance with example embodiments.

FIG. 4 visually shows a second portion of the series of steps, and example hardware, to construct a sensor group in accordance with example embodiments. In particular, shown at the first level 400 of FIG. 4 are two seismic sensors 224 and 226. With reference to seismic sensor 224 as representative, the seismic sensor 224 defines leads 240 in the form of a first electrical lead 406 (hereafter just lead 406) and a second electrical lead 408 (hereafter just lead 408). The representative seismic sensor 224 can be any suitable seismic sensor discussed in the Definitions section above. Much like the previously discussed electrical conductors, lead 406 comprises electrical insulation 410 covering an outer portion thereof, and lead 408 comprises electrical insulation 412 covering an outer portion thereof. At the distal end of the lead 406 the electrical insulation has been removed to expose the metallic conductor 414, and at the distal end of the lead 408 the electrical insulation has been removed to expose the metallic conductor 416.

The next step in the example method is to electrically couple the seismic sensor 224 to the twisted pair 230. In particular, the metallic conductor 414 of the lead 406 is electrically coupled to the exposed metallic conductor within window 310. Electrically coupling the lead 406 may be by soldering or micro-welding, and may be performed manually or by an automated process. However, because the clip 318 held the electrical conductors against twisting during the creation of the twisted pair 230, the exposed metallic conductor within the window 310 is easily accessible for soldering or micro-welding, and moreover the twisted pair 230 need not be untwisted at the location of the clip 318 prior to the electrical connection. Likewise, the metallic conductor 416 of lead 408 is electrically coupled to the metallic conductor exposed through the window 311 of the second electrical conductor in the clip 318. A similar process is executed with respect to the second seismic sensor 226 and the second clip 320, and all the remaining seismic sensors (not specifically shown) in the sensor group associated with the twisted pair 230.

The next step in the example method of constructing the sensor group is encapsulating with windows of each clip, such as shown with respect to the second level 418 of FIG. 4. In particular, level 418 shows two example method/systems for performing the encapsulation. The encapsulation with respect to the clip 318 (the clip 318 not visible in the second level 418) is discussed first. In some example methods, the clip 318, the electrical conductors 300 and 302 within the clip 318 (and a small length outside the clip 318 on each side) as well as the distal ends of the electrical leads 406 and 408 are encapsulated by way of an over-mold process. That is, a mold 420, such as a two-part mold as shown in FIG. 4, is place over the clip 318 and associated leads. The mold 420 defines an interior volume in which the clip 318, windows 310 and 311, and distal ends of the leads 406 and 408 reside when the mold 420 is in place. An encapsulant is injected into the interior volume of the mold 420, such as through port 422. The encapsulant may take any suitable form, such as any material that is initially liquid that hardens to a semi-solid or solid form and which, in the hardened state, resists water intrusion into the interior volume of the clip. In example cases, the encapsulant is epoxy. After the encapsulant has partially or fully cured, the mold 420 is removed to leave the encapsulant exposed, such as shown by encapsulant 424 of the third level 426 of FIG. 4.

Returning to the second level 418 of FIG. 4, a second encapsulation method is discussed with respect to clip 320. In particular, encapsulating the exposed electrical conductors may involve using the clip 320 as a container or mold for holding the encapsulant. That is, the encapsulant in liquid form is placed within the internal volume 340 of the clip 320, as shown by arrow 428. The clip 320 thus holds the encapsulant during the curing process. In situations where the clip 320 has an open bottom, the clip may be placed on a flat surface prior to the encapsulant being placed in the internal volume. In cases where the clip 320 has a solid bottom, the upward-oriented clip 320 itself thus holds the encapsulant during curing. Regardless, once cured the internal volume of the clip contains the encapsulant which is resistant to water intrusion, such as shown by the encapsulant 428 of the third level 426 of FIG. 4. As discussed with respect to clip 318, the encapsulant may take any suitable form, such as any material that is initially liquid that hardens to a semi-solid or solid form and which, in the hardened state, resists water intrusion into the interior volume of the clip. In example cases, the encapsulant is epoxy.

The discussion of creating a geophysical sensor cable continues in reference again to FIG. 2. With the twisted pair 230 for a sensor group constructed as discussed above, the twisted pair 230 and seismic sensors are coupled to the other components that ultimately reside in the interior volume 204 of the sensor cable 200. The locations of electrical coupling 242 and 246 are thus the locations of a clip (e.g., 318, 320) and associated windows with the leads of the seismic sensors 224 and 226 electrically coupled therein, and encapsulated in some form. The seismic sensors 224 and 226 may be placed in respective sensor holders 228 and 236. The sensor holders 238 and 236 may be placed at particular locations along the strength members 218 and 220 by slipping the strength members 218 and 220 within the respective channels (e.g., channel 232 for strength member 218). Likewise, the twisted pair 230 may be placed in channels (e.g., channel 234) of each sensor holder. The backbone communication channel 222 may be similarly placed. Finally, the acquisition module 238 for the sensor group may be communicatively coupled both to the twisted pair 230, and also to the backbone communication channel 222. The construction of the internal components continues for each sensor group of the sensor cable 200.

Once the various internal components of the sensor cable 200 are placed relative to each other, the outer jacket 202 is telescoped over the twisted pair 230, seismic sensors 224 and 226, and the various other components. Equivalently stated, once the various internal components of the sensor cable 200 are placed relative to each other, twisted pair and seismic sensors are placed within the outer jacket 202, and the remaining connections made, such as mechanically coupling the strength members to the couplers 212 and 216, mechanically and communicatively coupling the backbone communication channel 222 to the couplers 212 and 216, telescoping the outer jacket 202 over the reduced diameter portions, etc. Finally, interior volume 204 of the sensor cable 200 is filled with a buoyancy control material, such as foam material that is pumped through interior volume 204 and which expands to displace the air in the sensor cable 200.

Figure 5:
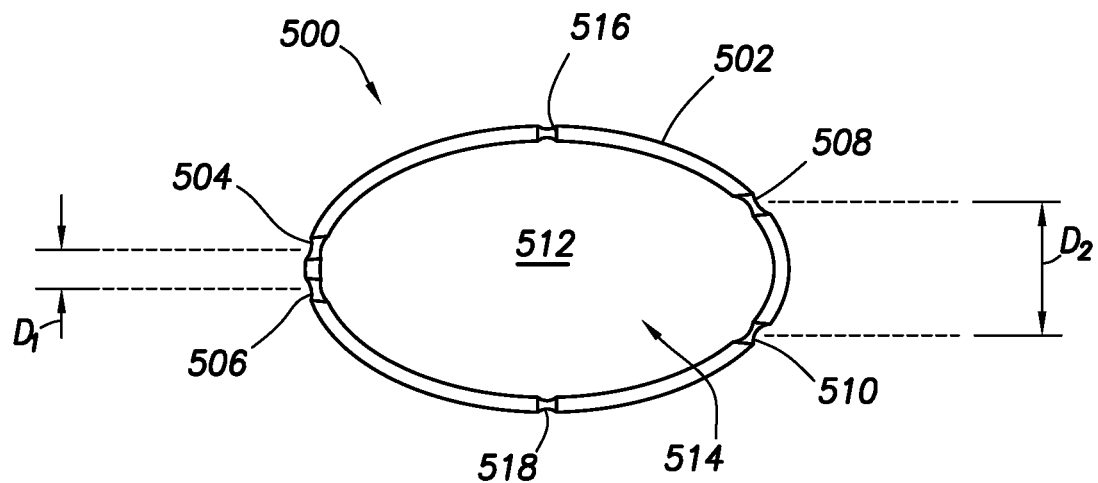
FIG. 5 shows an overhead view of a clip in accordance with example embodiments.

FIG. 5 shows an overhead view of a clip 500 in accordance with other example embodiments. Clip 500 could be used in additional to, or in place of, clips 318 and 320 (FIG. 3). In particular, clip 500 illustrates several alternatives clip features, but not all the alternative features need be present. For example, wall 502 of clip 500 is shown to have an elliptical shape when viewed from above, but other shapes without straight sides are possible, such as circular and oval. Example clip 500 further defines a plurality of notches or slots. Slots 504 and 506 reside on a first side of the clip 500, and like the previously discussed slots, slots 504 and 506 are open at the top of the wall 502, and in example embodiments the slots have internal dimensions (e.g., internal diameters) sized to be slightly smaller than an outside diameter of the electrical insulation of the electrical conductors. Likewise, the example clip 500 comprises notches or slots 508 and 510. The slots are open at the top of the wall 502, and in example embodiments the slots have internal dimensions (e.g., internal diameters) sized to be slightly smaller than an outside diameter of the electrical insulation of the electrical conductors. In some cases, the clip 500 has a wall at the bottom 512 such than the internal volume 514 of the clip defines a trough, but in other cases the bottom 512 may be omitted.

The previous clips had slots for the electrical conductors of the twisted pair 230 only; however, example clip 500 further comprises notches or slots 516 and 518 on wall 502, and in example embodiments the slots 516 and 518 have internal dimensions (e.g., internal diameters) sized to be slightly smaller than an outside diameter of the electrical insulation of the leads of the seismic sensors. Slots 516 and 518 are shown between the ends where slots 504-510 reside, but in the slots 516 and 518 may be placed at any suitable location. Moreover, the slots 516 and 518 are shown on the same (upper) surface of the clip 500, but in yet still further cases the slots 516 and 518 may be on an opposite (under) surface of the clip 500.

Also shown in FIG. 5 is that the slots 504-510 need not be arranged such that the electrical conductors are parallel within the internal volume 514. That is the distance D1 between slots 504 and 506 is smaller than the distance D2 between slots 508 and 510 on the opposite end of the clip 500. Thus, when the electrical conductors are placed within the slots, the electrical conducts are not twisted within the clip 500, and are also not parallel within the clip.

Figure 6:
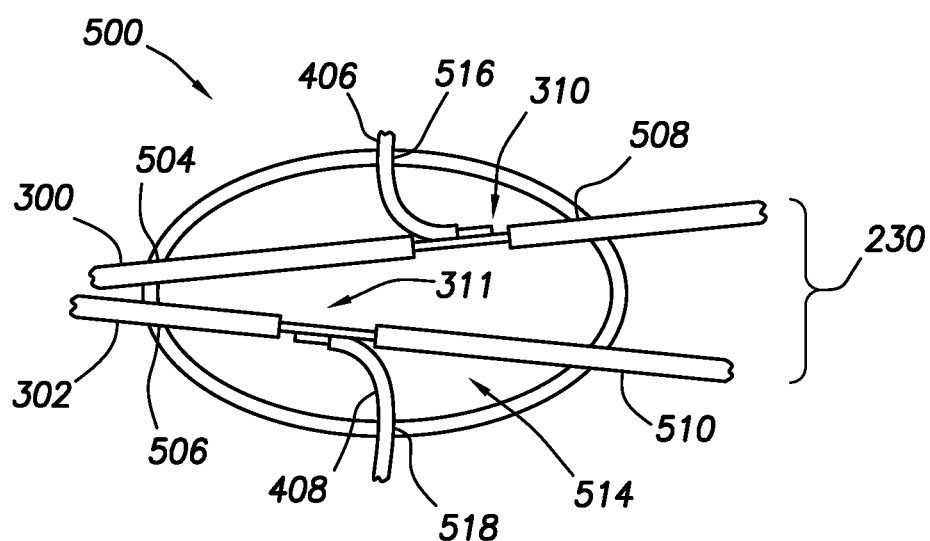
FIG. 6 shows an overhead view of a clip with electrical conductors coupled thereto in accordance with example embodiments.

FIG. 6 shows an overhead view of the example clip 500 with electrical conductors of the twisted pair 230 therein. In particular, electrical conductor 300 is disposed within slot 504 on one side of the clip 500, and is disposed within slot 508 on the opposite side of the clip 500 such than window 310 is disposed within the internal volume 514 of the clip 500. Electrical conductor 302 is disposed within slot 506 on one side of the clip 500, and is disposed within slot 510 on the opposite side of the clip 500 such than window 311 is disposed within the internal volume 514 of the clip 500. Unlike the previous embodiments, the windows 310 and 311, while both within the internal volume 514 of the clip 500, are not fully aligned; rather, the windows 310 and 311 are axially offset from each other. The offset windows may be helpful in electrically coupling of the leads to the electrical conductors within the windows, particularly in automated processing. Moreover, as discussed above, because of the slot 504-510 placement, the electrical conductors 300 and 302 are not parallel within internal volume of the example clip 500, which may be helpful in electrically coupling of the leads, particularly in automated processing.

FIG. 6 also shows lead 406 disposed within slot 516, and lead 408 disposed within slot 518. Thus, use of slots 516 and 518 may assist in holding the leads in proper orientation for electrically coupling the leads to the electrical conductors within the windows 310 and 311. Thus, the slots 516 and 518 may make a manual process of electrically coupling the leads to the electrical conductors easier, and further may enable an automated process of electrically coupling the leads to the electrical conductors.

FIG. 7 shows a method in accordance with at least some embodiments. In particular, the method starts (block 700) and comprises creating a geophysical sensor cable (block 702). The creating of the geophysical sensor cable may be by: creating a first window through the insulation of a first electrical conductor (block 704); creating a second window through the insulation of a second electrical conductor (block 706); placing the first and second electrical conductors in a clip, the clip defining a perimeter and an internal volume, the first and second windows reside within the perimeter after the placing (block 708); twisting the first and second electrical conductors to create a twisted pair, the first and second electrical conductors remaining untwisted within the boundaries of the clip (block 710); electrically coupling a first lead of a seismic sensor to the first electrical conductor through the first window (block 712); electrically coupling a second lead of the seismic sensor to the second electrical conductor through the second window (block 714); encapsulating at least a portion of the internal volume including first and second window within the clip such that the internal volume is resistant to water intrusion (block 716); and placing the twisted pair and the seismic sensor within an outer jacket of a geophysical sensor cable (block 718). Thereafter, the method ends (block 720).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of manufacturing a geophysical sensor cable, comprising:
creating a first window through the insulation of a first electrical conductor;
creating a second window through the insulation of a second electrical conductor;
placing the first and second electrical conductors in a clip, the clip defining a perimeter and an internal volume, the first and second windows reside within the perimeter after the placing; and then
twisting the first and second electrical conductors to create a twisted pair, the first and second electrical conductors remaining untwisted within the boundaries of the clip;
electrically coupling a first lead of a seismic sensor to the first electrical conductor through the first window;
electrically coupling a second lead of the seismic sensor to the second electrical conductor through the second window; and then
encapsulating at least a portion of the internal volume including first and second window within the clip such that the internal volume is resistant to water intrusion; and
placing the twisted pair and the seismic sensor within an outer jacket of a geophysical sensor cable.

2. The method of claim 1 further comprising, prior to placing the first and second electrical conductors in a clip, aligning the first and second windows such that proximal ends of each window reside in the same plane and the first and second electrical conductors are perpendicular to the plane.

3. The method of claim 1 further comprising, prior to placing the first and second electrical conductors in a clip, offsetting the first window from the second window such that the first window is offset from the second window after the placing within the clip.

4. The method of claim 1 wherein placing the first and second electrical conductors in the clip further comprises:
pushing insulation on a first side of the first window into a first slot defined on a first end of the clip;
pushing insulation on a second side of the first window into a second slot defined on a second end of the clip opposite the first end;
pushing insulation on a first side of the second window into a third slot defined on the first end of the clip; and pushing insulation on a second side of the second window into a fourth slot defined on the second end of the clip.

5. The method of claim 4 wherein, prior to electrically coupling the first lead of the seismic sensor to the first electrical conductor, the method further comprises pushing insulation of the first lead into a fifth slot.

6. The method of claim 1 wherein encapsulating further comprises encapsulating the entire clip in the encapsulant.

7. A geophysical sensor cable comprising:
an outer jacket that defines an interior volume, a first end, and a second end opposite the first end along a long central axis of the outer jacket;
a rope that extends through the interior volume of the outer jacket;
a first coupler that defines a first reduced diameter portion, the first end of the outer jacket telescoped over the first reduced diameter portion of the first coupler, and the first coupler mechanically coupled to a first end of the rope;
a second coupler that defines a second reduced diameter portion, the second end of the outer jacket telescoped over the second reduced diameter portion of the second coupler, and the second coupler mechanically coupled to a second end of the rope;
a backbone communication channel coupled on a first end to the first coupler, and the backbone communication channel coupled on a second end to the second coupler, the backbone communication channel extends through the interior volume;
a twisted pair that extends at least partially through the interior volume of the outer jacket, the twisted pair comprising a first electrical conductor with electrical insulation on an outside diameter thereof and a second electrical conductor with electrical insulation on an outside diameter thereof;
a first clip coupled to the twisted pair, the first and second electrical conductors not twisted within the first clip;
a first window through the electrical insulation of the first electrical conductor and a second window through the electrical insulation of the second electrical conductor, the first and second windows reside within a perimeter defined by the first clip;
a first seismic sensor disposed within the outer jacket at a first location along the geophysical sensor cable, the first seismic sensor defines a first electrical lead and a second electrical lead, the first electrical lead electrically coupled to the first electrical conductor through the first window, and the second electrical lead electrically coupled to the second electrical conductor through the second window;
a second clip coupled to the twisted pair at a spaced-apart location from the first clip, the first and second electrical conductors not twisted within the second clip;
a third window through the electrical insulation of the first electrical conductor and a fourth window through the electrical insulation of the second electrical conductor, the third and fourth windows reside within a perimeter defined by the second clip;
a second seismic sensor disposed within the outer jacket at a second location along the geophysical sensor cable, the second seismic sensor defines a third electrical lead and a fourth electrical lead, the third electrical lead electrically coupled to the first electrical conductor through the third window, and the fourth electrical lead electrically coupled to the second electrical conductor through the fourth window; and
an acquisition module disposed within the interior volume and communicatively coupled to the twisted pair, and the acquisition module also communicatively coupled to the backbone communication channel.

8. The geophysical sensor cable of claim 7 wherein the first and second electrical conductors are parallel within the first clip.

9. The geophysical sensor cable of claim 7 further comprising:
a first encapsulant within an interior volume of the first clip, the first encapsulant encapsulating the first and second windows; and
a second encapsulant within an interior volume of the second clip, the first encapsulant encapsulating the third and fourth windows.

10. The geophysical sensor cable of claim 7
wherein the first clip further comprises:
a first notch on a first side of the first clip, the first electrical conductor disposed within the first notch;
a second notch on the first side of the first clip, the second electrical conductor disposed within the second notch;
a third notch on a second side of the first clip, the second side opposite the first side, and the first electrical conductor disposed within the third notch; and
a fourth notch on the second side of the first clip, the second electrical conductor disposed within the fourth notch; and
wherein the second clip further comprises:
a fifth notch on a first side of the second clip, the first electrical conductor disposed within the fifth notch;
a sixth notch on the first side of the second clip, the second electrical conductor disposed within the sixth notch;
a seventh notch on a second side of the second clip, the second side of the second clip opposite the first side of the second clip, and the first electrical conductor disposed within the seventh notch; and
an eighth notch on the second side of the second clip, the second electrical conductor disposed within the eighth notch.

11. The geophysical sensor cable of claim 7 wherein:
a first boundary of the first window resides within a first plane, the first plane perpendicular to the first electrical conductor within the first clip, and a second boundary of the first window on a first side of the first plane; and
a first boundary of the second window resides within the first plane, and a second boundary of the second window on the first side of the first plane.

12. The geophysical sensor cable of claim 7 further comprising:
a first sensor holder disposed within the outer jacket at the first location, the first seismic sensor held by the first sensor holder, and the twisted pair extends through an aperture of the first sensor holder; and
a second sensor holder disposed within the outer jacket at the second location, the second seismic sensor held by the second sensor holder, and the twisted pair extends through an aperture of the second sensor holder.

13. A geophysical sensor cable comprising:
an outer jacket that defines an interior volume, a first end, and a second end opposite the first end along a long central axis of the outer jacket;
a rope that extends through the interior volume of the outer jacket;

a first coupler that defines a first reduced diameter portion, the first end of the outer jacket telescoped over the first reduced diameter portion of the first coupler, and the first coupler mechanically coupled to a first end of the rope;

a second coupler that defines a second reduced diameter portion, the second end of the outer jacket telescoped over the second reduced diameter portion of the second coupler, and the second coupler mechanically coupled to a second end of the rope;

a backbone communication channel coupled on a first end to the first coupler, and the backbone communication channel coupled on a second end to the second coupler, the backbone communication channel extends through the interior volume; and a plurality of sensor groups, each sensor group comprising:
- a twisted pair that extends at least partially through the interior volume of the outer jacket, the twisted pair comprising a first electrical conductor with electrical insulation on an outside diameter thereof and a second electrical conductor with electrical insulation on an outside diameter thereof;
- a first clip coupled to the twisted pair, the first and second electrical conductors not twisted within the first clip;
- a first window through the electrical insulation of the first electrical conductor and a second window through the electrical insulation of the second electrical conductor, the first and second windows reside within the first clip;
- a first seismic sensor disposed within the outer jacket at a first location along the geophysical sensor cable, the first seismic sensor defines a first electrical lead and a second electrical lead, the first electrical lead electrically coupled to the first electrical conductor through the first window, and the second electrical lead electrically coupled to the second electrical conductor through the second window;
- a second clip coupled to the twisted pair at a spaced apart location from the first clip, the first and second electrical conductors not twisted within the second clip;
- a third window through the electrical insulation of the first electrical conductor and a fourth window through the electrical insulation of the second electrical conductor, the third and fourth windows reside within a volume defined by the second clip;
- a second seismic sensor disposed within the outer jacket at a first location along the geophysical sensor cable, the second seismic sensor defines a third electrical lead and a fourth electrical lead, the third electrical lead electrically coupled to the first electrical conductor through the third window, and the fourth electrical lead electrically coupled to the second electrical conductor through the fourth window; and
- an acquisition module disposed within the interior volume and communicatively coupled to the twisted pair, and the acquisition module also communicatively coupled to the backbone communication channel.

14. The geophysical sensor cable of claim 13 wherein each sensor group of the plurality of sensor groups further comprises:

a first encapsulant within an interior volume of the first clip, the first encapsulant encapsulating the first and second windows; and a second encapsulant within an interior volume of the second clip, the first encapsulant encapsulating the third and fourth windows.

15. The geophysical sensor cable of claim 13 wherein each sensor group of the plurality of sensor groups further comprises:

a first notch on a first side of the first clip, the first electrical conductor disposed within the first notch;

a second notch on the first side of the first clip, the second electrical conductor disposed within the second notch;

a third notch on a second side of the first clip, the second side opposite the first side, and the first electrical conductor disposed within the third notch; and a fourth notch on the second side of the first clip, the second electrical conductor disposed within the fourth notch;

a fifth notch on a first side of the second clip, the first electrical conductor disposed within the fifth notch;

a sixth notch on the first side of the second clip, the second electrical conductor disposed within the sixth notch;

a seventh notch on a second side of the second clip, the second side of the second clip opposite the first side of the second clip, and the first electrical conductor disposed within the seventh notch; and an eighth notch on the second side of the second clip, the second electrical conductor disposed within the eighth notch.

16. The geophysical sensor cable of claim 13 wherein each sensor group of the plurality of sensor groups further comprises:

a first boundary of the first window resides a first plane, the first plane perpendicular to the first electrical conductor within the first clip, and a second boundary of the first window on a first side of the first plane; and a first boundary of the second window resides within the first plane, and a second boundary of the second window on the first side of the first plane.

17. The geophysical sensor cable of claim 13 wherein each sensor group of the plurality of sensor groups further comprises:

a first sensor holder disposed within the outer jacket at the first location, the first seismic sensor held by the first sensor holder, and the twisted pair extends through an aperture of the first sensor holder; and a second sensor holder disposed within the outer jacket at the second location, the second seismic sensor held by the second sensor holder, and the twisted pair extends through an aperture of the second sensor holder.

18. A system comprising:

a tow vessel comprising a data acquisition system;

a plurality of sensor streamers that extend behind the tow vessel; and a plurality of lead-in cables coupled one each to each sensor streamer, and also coupled to the tow vessel, the data acquisition system communicatively coupled to the sensor streamers by way of the lead-in cables;

each sensor streamer comprising a plurality of geophysical sensor cables mechanically and communicatively coupled together by way of couplers, each geophysical sensor cable comprising:
- an outer jacket that defines an interior volume, a first end, and a second end opposite the first end along a long central axis of the outer jacket;

a rope that extends through the interior volume of the outer jacket;

a first coupler coupled on a first end of the outer jacket, and the first coupler mechanically coupled to a first end of the rope;

a second coupler coupled on a second end of the outer jacket, and the second coupler mechanically coupled to a second end of the rope;

a backbone communication channel coupled on a first end to the first coupler, and the backbone communication channel coupled on a second end to the second coupler, the backbone communication channel extends through the interior volume;

a twisted pair that extends at least partially through the interior volume of the outer jacket, the twisted pair comprising a first electrical conductor with electrical insulation on an outside diameter thereof and a second electrical conductor with electrical insulation on an outside diameter thereof;

a first clip coupled to the twisted pair, the first and second electrical conductors not twisted within the first clip;

a first window through the electrical insulation of the first electrical conductor and a second window through the electrical insulation of the second electrical conductor, the first and second windows reside within the first clip;

a first seismic sensor disposed within the outer jacket at a first location along the geophysical sensor cable, the first seismic sensor defines a first electrical lead and a second electrical lead, the first electrical lead electrically coupled to the first electrical conductor through the first window, and the second electrical lead electrically coupled to the second electrical conductor through the second window;

a second clip coupled to the twisted pair, the first and second electrical conductors not twisted within the second clip;

a third window through the electrical insulation of the first electrical conductor and a fourth window through the electrical insulation of the second electrical conductor, the third and fourth windows reside within the second clip;

a second seismic sensor disposed within the outer jacket at a second location along the geophysical sensor cable, the second seismic sensor defines a third electrical lead and a fourth electrical lead, the third electrical lead electrically coupled to the first electrical conductor through the third window, and the fourth electrical lead electrically coupled to the second electrical conductor through the fourth window; and an acquisition module disposed within the interior volume and communicatively coupled to the twisted pair, and the acquisition module also communicatively coupled to the backbone communication channel.

19. The system of claim 18 wherein each geophysical sensor cable further comprising:

a first encapsulant within an interior volume of the first clip, the first encapsulant encapsulating the first and second windows; and a second encapsulant within an interior volume of the second clip, the first encapsulant encapsulating the third and fourth windows.

20. The system of claim 18 wherein each geophysical sensor cable further comprising:

a first notch on a first side of the first clip, the first electrical conductor disposed within the first notch;

a second notch on the first side of the first clip, the second electrical conductor disposed within the second notch;

a third notch on a second side of the first clip, the second side opposite the first side, and the first electrical conductor disposed within the third notch; and a fourth notch on the second side of the first clip, the second electrical conductor disposed within the fourth notch;

a fifth notch on a first side of the second clip, the first electrical conductor disposed within the fifth notch;

a sixth notch on the first side of the second clip, the second electrical conductor disposed within the sixth notch;

a seventh notch on a second side of the second clip, the second side of the second clip opposite the first side of the second clip, and the first electrical conductor disposed within the seventh notch; and an eighth notch on the second side of the second clip, the second electrical conductor disposed within the eighth notch.

21. The system of claim 18 wherein each geophysical sensor cable further comprising:

a first boundary of the first window resides a first plane, the first plane perpendicular to the first electrical conductor within the first clip, and a second boundary of the first window on a first side of the first plane; and a first boundary of the second window resides within the first plane, and a second boundary of the second window on the first side of the first plane.

22. The system of claim 18 wherein each geophysical sensor cable further comprising:

a first sensor holder disposed within the outer jacket at the first location, the first seismic sensor held by the first sensor holder, and the twisted pair extends through an aperture of the first sensor holder; and a second sensor holder disposed within the outer jacket at the second location, the second seismic sensor held by the second sensor holder, and the twisted pair extends through an aperture of the second sensor holder.

* * * * *